(12) United States Patent
Liu et al.

(10) Patent No.: US 11,305,817 B2
(45) Date of Patent: Apr. 19, 2022

(54) SOFT GROUND CRAWLING ROBOT

(71) Applicant: SHENYANG INSTITUTE OF AUTOMATION, CHINESE ACADEMY OF SCIENCES, Liaoning (CN)

(72) Inventors: Jinguo Liu, Liaoning (CN); Chenguang Chang, Liaoning (CN); Qingliang Song, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 157 days.

(21) Appl. No.: 16/959,414

(22) PCT Filed: Dec. 21, 2018

(86) PCT No.: PCT/CN2018/122509
§ 371 (c)(1),
(2) Date: Jun. 30, 2020

(87) PCT Pub. No.: WO2019/128855
PCT Pub. Date: Jul. 4, 2019

(65) Prior Publication Data
US 2020/0331546 A1    Oct. 22, 2020

(30) Foreign Application Priority Data
Dec. 30, 2017   (CN) .......................... 201711490823.7

(51) Int. Cl.
*B62D 11/04*     (2006.01)
*B62D 57/02*     (2006.01)

(52) U.S. Cl.
CPC ............ *B62D 11/04* (2013.01); *B62D 57/022* (2013.01)

(58) Field of Classification Search
CPC .............................. B62D 11/04; B62D 57/022
See application file for complete search history.

(56) References Cited

FOREIGN PATENT DOCUMENTS

| CN | 104386152 A | 3/2015 |
|----|-------------|--------|
| CN | 204956698 U | 1/2016 |

(Continued)

*Primary Examiner* — Kevin Hurley
(74) *Attorney, Agent, or Firm* — Novick, Kim & Lee, PLLC; Allen Xue (57) ABSTRACT

The present invention belongs to the field of robots, and relates to a soft ground crawling robot. Front wheels are connected on both sides of the front end of a body shell; a universal wheel is arranged on the rear end; rotary stepping motors are installed on both sides of a supporting assembly; an output shaft of the rotary stepping motor on each side passes through the body shell and then is connected with the front wheel on the same side; a swinging stepping motor is installed on the supporting assembly; the output shaft is connected with a connecting plate; the connecting plate is connected with the body shell through a connecting shaft; the body shell is driven to swing by the swinging stepping motor; lower end covers are rotatably connected on both sides of the body shell; a wheel bracket is connected to the rotary stepping motor on each side; and the wheel bracket on each side is connected with the lower end cover on the same side. The crawling robot of the present invention can crawl on all soft ground while moving in a plane, and overcome the phenomenon that some existing crawling robots cannot walk and work on the soft ground such as sand due to sinking.

8 Claims, 7 Drawing Sheets

(56) References Cited

FOREIGN PATENT DOCUMENTS

| | | | |
|---|---|---|---|
| CN | 105292300 A | | 2/2016 |
| CN | 105972705 A | * | 9/2016 |
| CN | 106428281 A | * | 2/2017 |
| CN | 108032920 A | | 5/2018 |
| CN | 207683649 U | | 8/2018 |
| EP | 2735497 A1 | | 5/2014 |
| JP | 2012236249 A | | 12/2012 |

\* cited by examiner

SOFT GROUND CRAWLING ROBOT

TECHNICAL FIELD

The present invention belongs to the field of robots, and particularly relates to a soft ground crawling robot.

BACKGROUND

A wheeled mobile robot is widely used to replace people to perform dangerous operation, planetary exploration and polar scientific research. Soft ground environments such as swamp and sand are inevitable working environments for the wheeled mobile robot. It is difficult to continue walking or working when robot wheels are in slipping and sinking states on the soft ground. In order to ensure the normal running of the robot, the robot is out of trouble by continuously increasing the traction force of the robot wheels or increasing the contact area between the robot and the ground.

SUMMARY

In view of the problem that the traditional wheeled robot cannot walk and work on soft ground such as sand due to sinking, the purpose of the present invention is to provide a soft ground crawling robot. The crawling robot can crawl on all soft ground while moving in a plane.

The purpose of the present invention is realized by the following technical solution:

The present invention comprises front wheels, a universal wheel, lower end covers, a body shell, and a connecting plate, connecting shafts, wheel brackets, a supporting assembly, rotary stepping motors and a swinging stepping motor which are respectively installed in the body shell, wherein the front wheels are connected on both sides of the front end of the body shell; the universal wheel is arranged on the rear end; the rotary stepping motors are installed on both sides of the supporting assembly; an output shaft of the rotary stepping motor on each side passes through the body shell and then is connected with the front wheel on the same side; the swinging stepping motor is installed on the supporting assembly; the output shaft is connected with the connecting plate; the connecting plate is connected with the body shell through the connecting shaft; the body shell is driven to swing by the swinging stepping motor; the lower end covers are rotatably connected on both sides of the body shell; the wheel bracket is connected to the rotary stepping motor on each side; and the wheel bracket on each side is connected with the lower end cover on the same side.

Each front wheel comprises a front wheel body and front wheel end covers; the front wheel body is connected with the output shaft of the rotary stepping motor; the front wheel end covers are installed on both sides of the front wheel body; the wheel surface of the front wheel body is provided with a plurality of equidistant inner concave surfaces with the same size along the circumferential direction; and the front wheel end covers are arc-shaped wheel covers protruding outwards.

The connecting plate is arc-shaped; both ends are respectively provided with the connecting shafts connected with the body shell; a position between both ends of the connection plate extends upwards to form an extension part A; the extension part is provided with the connecting shaft connected with the body shell; the end part of one end of the connecting plate extends downwards to form an extension part B; and the extension part B is connected with the output shaft of the swinging stepping motor.

The connecting plate is provided with flanges in the positions of connection of the connecting shafts; each of the connecting shafts is passed by the flange; and both ends are connected with the body shell.

The swinging stepping motor is installed on the supporting assembly through a joint bracket; one end of the joint bracket is cylindrical, and the other end is an "L"-shaped plate; a body bracket is arranged on the connecting plate; one end of the body bracket is cylindrical, is sleeved on the cylindrical end of the joint bracket, and is connected with the output shaft of the swinging stepping motor.

The supporting assembly comprises an I-shaped supporting plate, a lower supporting plate and an upper supporting plate; both ends of the upper supporting plate and both ends of the lower supporting plate are respectively connected with the wheel brackets on both sides; the I-shaped supporting plate is connected between the lower supporting plate and the upper supporting plate; and both sides of the I-shaped supporting plate are respectively provided with the rotary stepping motors installed on the lower supporting plate to drive the front wheels.

The body shell is divided into left and right parts with the same shape and structure.

The present invention has the advantages and positive effects that:

1. The important components of the present invention are sealed in the body shell and can be well protected.

2. The present invention is provided with two front wheels and one universal wheel. The universal wheel plays an auxiliary role, and can ensure stable walking or standing on normal ground.

3. The wheel surfaces of the two front wheel bodies of the present invention are equidistant inner concave surfaces with the same size, and convex arc surfaces are assembled on both ends. The grooves formed therein can prevent the sand under the wheel surfaces from flowing, so as to improve the bearing capacity and traction efficiency of the sand.

4. The diameter of the end covers of the two front wheels of the present invention is slightly larger than the diameter of the wheel body. Rubber rings can be installed on the outer edges of the wheel covers, so as to walk well on ordinary ground. The end covers have a convex arc shape, and can increase the contact area between the wheels and the sand, to better prevent the wheels from sinking.

5. The present invention has three degrees of freedom. Two degrees of rotational freedom are used to realize the movement of a trolley, and the other degree of swinging freedom is used to adjust the attitude of the trolley.

6. The present invention can realize upright walking on the normal ground, can automatically fall to the ground and crawl on the soft ground, greatly increase the contact area with the soft ground when falling to the ground and crawling, reduce the intensity of pressure on the ground, and also automatically change from a crawling state to an upright walking state.

Wherein: 1 connecting plate; 2 flange; 3 connecting shaft; 4 lower end cover; 5 wheel bracket; 6 front wheel body; 7 front wheel end cover; 8 universal wheel; 9 I-shaped supporting plate; 10 lower supporting plate; 11 rotary stepping motor; 12 upper supporting plate; 13 swinging stepping motor; 14 body bracket; 15 body shell; 16 joint bracket; and 17 inner concave surface.

DETAILED DESCRIPTION

The present invention is further detailed below in combination with the drawings.

Figure 1:
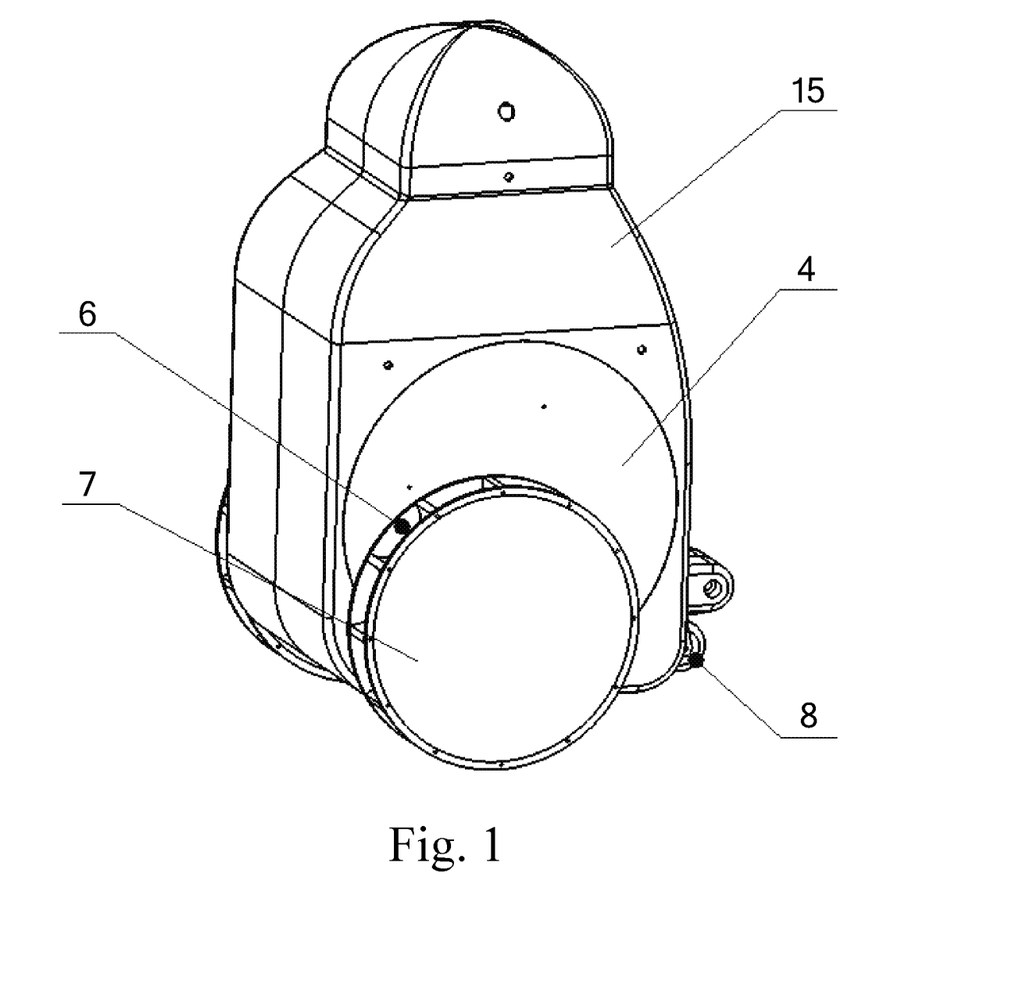
FIG. 1 is a schematic diagram of an external stereographic structure of the present invention.
Figure 2:
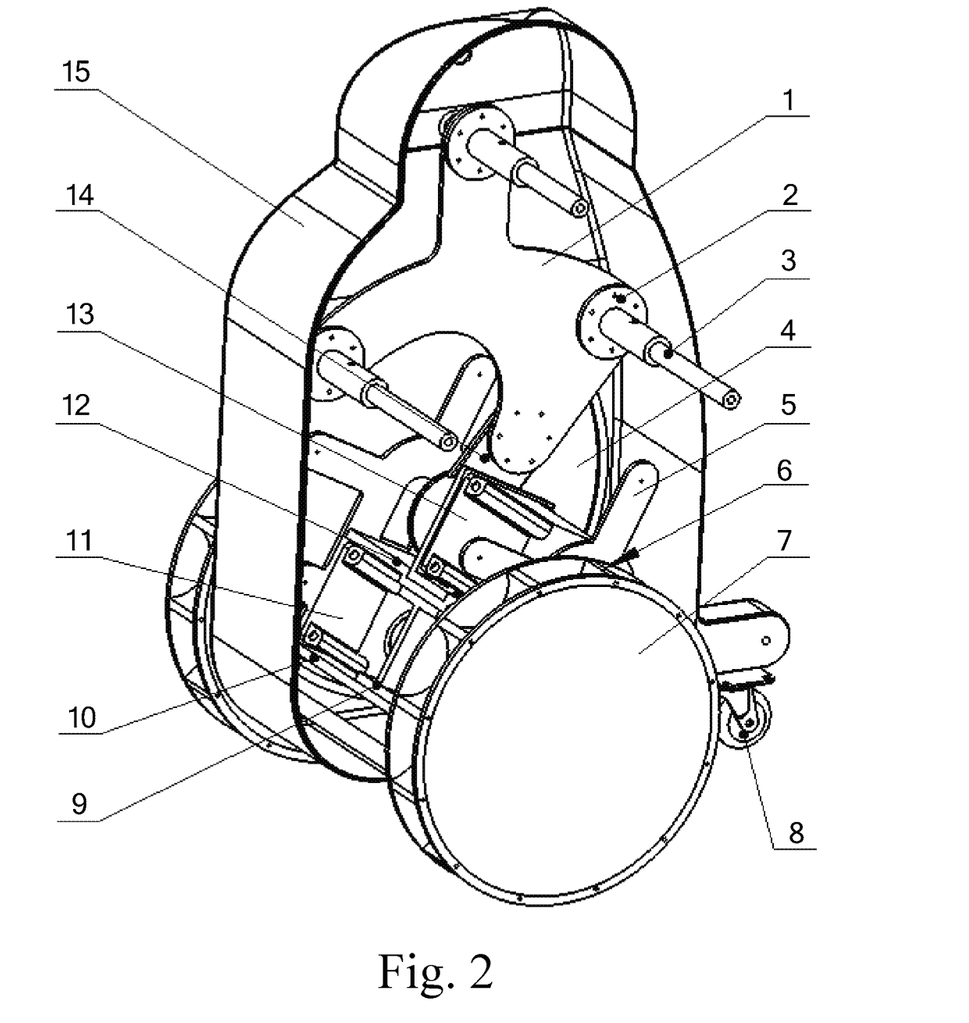
FIG. 2 is a stereographic structural schematic diagram after half of a shell is taken away in the present invention.
Figure 3:
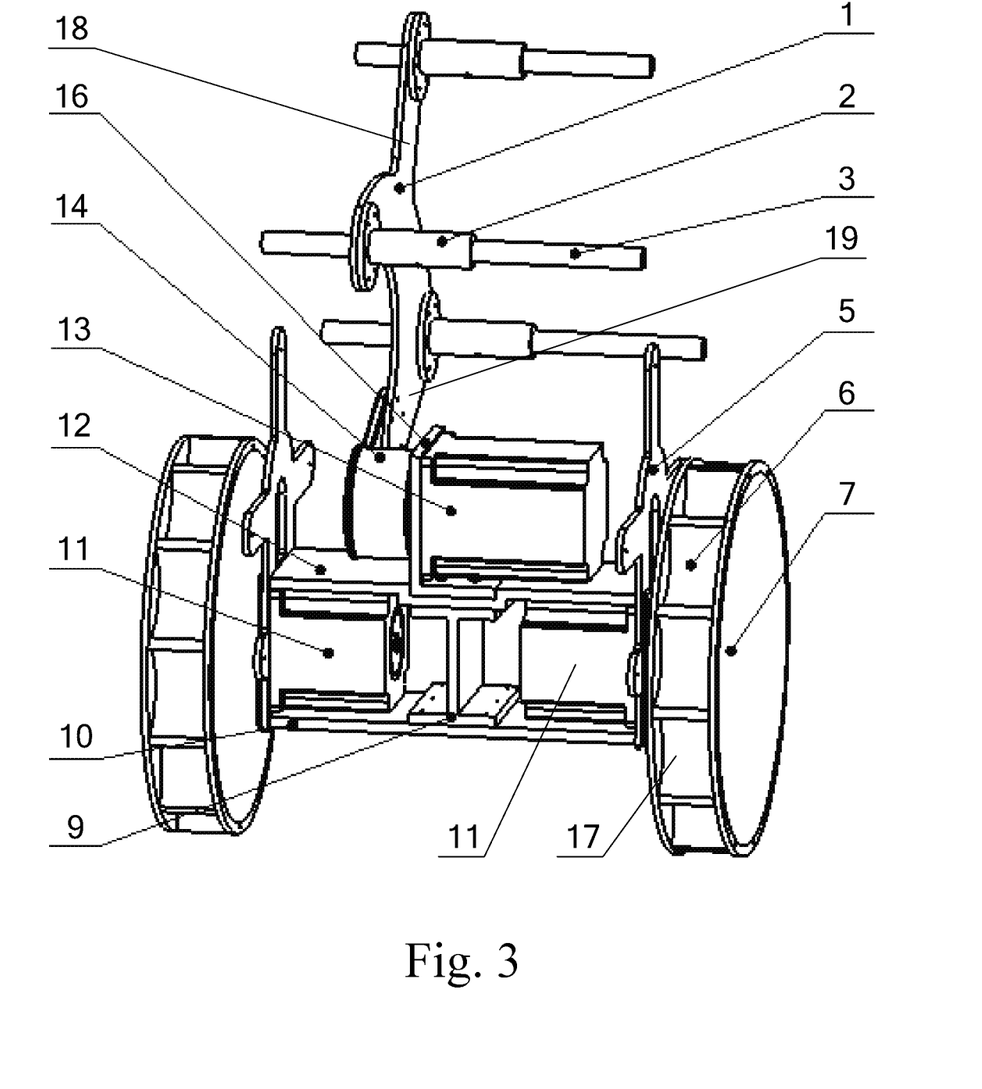
FIG. 3 is an internal structural schematic diagram of the present invention.

As shown in FIGS. 1-3, the present invention comprises front wheels, a universal wheel 8, lower end covers 4, a body shell 15, and a connecting plate 1, connecting shafts 3, wheel brackets 5, a supporting assembly, rotary stepping motors 11 and a swinging stepping motor 13 which are respectively installed in the body shell 15, wherein the body shell 15 is divided into left and right parts with the same shape and structure and the left and the right parts are docked to form a cavity body. The front wheels are connected below both sides of the front end of the body shell 15; and the universal wheel 8 is arranged on the rear end. The front wheels on both sides of the body shell 15 are symmetrically arranged. Each front wheel comprises a front wheel body 6 and front wheel end covers 7; the wheel surface of the front wheel body 6 is provided with a plurality of equidistant inner concave surfaces 17 with the same size along the circumferential direction; the front wheel end covers 7 are installed on both sides of the front wheel body 6; and the front wheel end covers 7 are arc-shaped wheel covers protruding outwards.

The supporting assembly is positioned on the lower side inside the body shell 15, and comprises an I-shaped supporting plate 9, a lower supporting plate 10 and an upper supporting plate 12; both ends of the upper supporting plate 12 and both ends of the lower supporting plate 10 are respectively connected with the wheel brackets 5; the I-shaped supporting plate 9 is connected between the lower supporting plate 10 and the upper supporting plate 12; both sides of the I-shaped supporting plate 9 are respectively provided with the rotary stepping motors 11 fixedly connected to the lower supporting plate 10 to drive the front wheels on the same side to rotate; and the output shaft of the rotary stepping motor 11 on each side is penetrated by the body shell 15 and connected by the front wheel bodies 6 on the same side. Lower end covers 4 are rotatably connected on both sides of the body shell 15; and the lower end cover 4 on each side is respectively connected with the wheel bracket 5 on the same side.

The connecting plate 1 is arc-shaped; both ends are respectively provided with the connecting shafts 3 connected with the body shell 15; a position between both ends of the connection plate 3 extends upwards to form an extension part A18; the extension part 18 is provided with the connecting shaft 3 connected with the body shell 15; The connecting plate 1 is provided with flanges 2 in the positions of connection of the connecting shafts 3; each of the connecting shafts 3 is passed by the flange 2; and both ends are connected with the body shell 15. The end part of one end of the connecting plate 1 extends downwards to form an extension part B19; and the extension part B19 is connected with a body bracket 14. The connecting plate 1 has four connecting points. Three connecting points are connected with the connecting shafts 3 through the flanges 2, and connected with the body shell 15 through the connecting shafts 3. The other connecting point of the connecting plate 1 is connected with the body bracket 14. The swinging stepping motor 13 is fixed to the upper supporting plate 12 through a joint bracket 16; one end of the joint bracket 16 is cylindrical, and the other end is an "L"-shaped plate. One end of the body bracket 14 is cylindrical, is sleeved on the cylindrical end of the joint bracket 16, and is connected with the output shaft of the swinging stepping motor 13.

Figure 4:
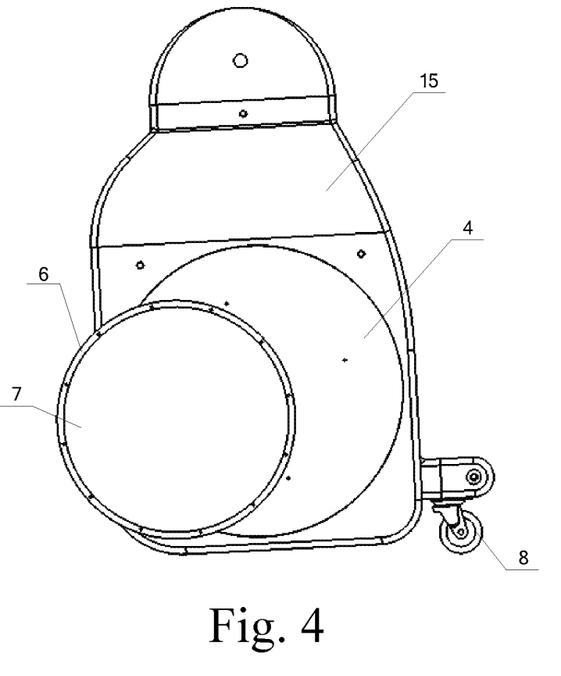
FIG. 4 is a structural schematic diagram of an initial state of the present invention.
Figure 5:
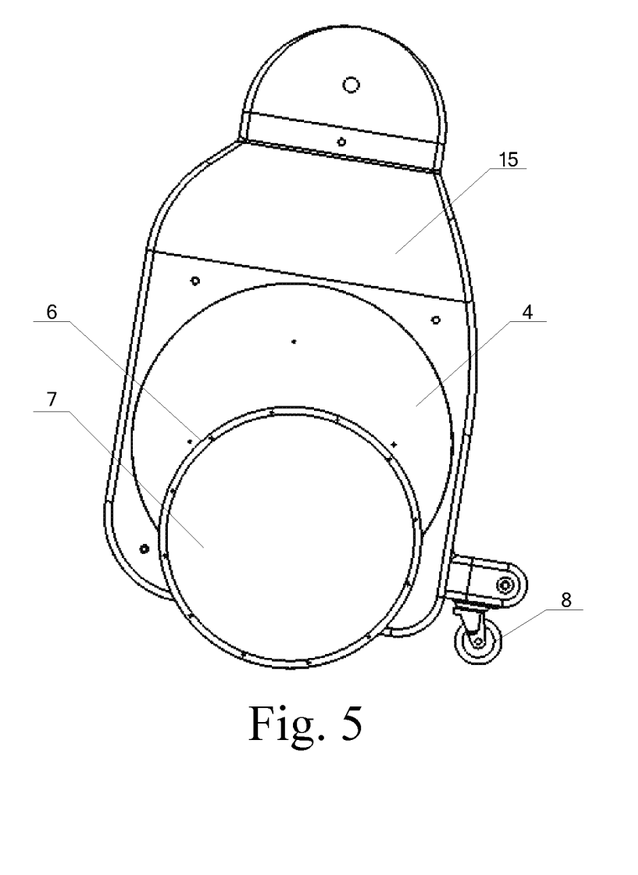
FIG. 5 is a structural schematic diagram in an erect walking state of the present invention.
Figure 6:
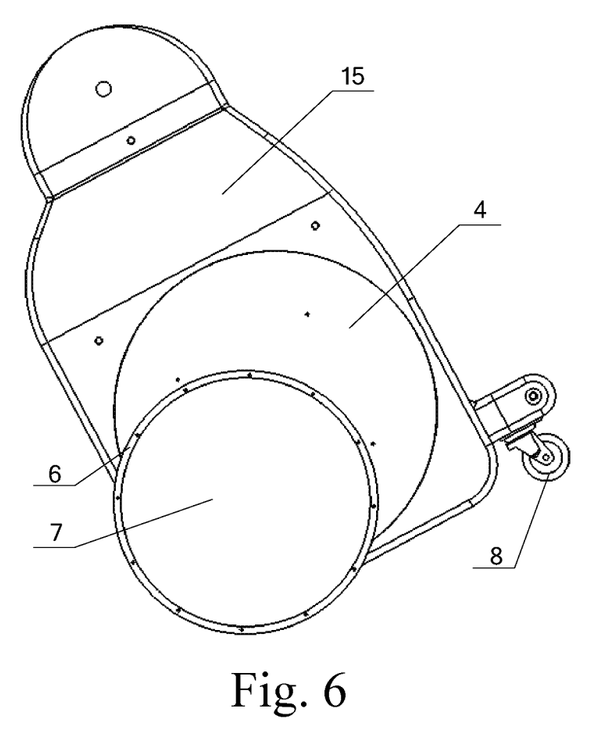
FIG. 6 is a structural schematic diagram in a self-balancing state of the present invention.
Figure 7:
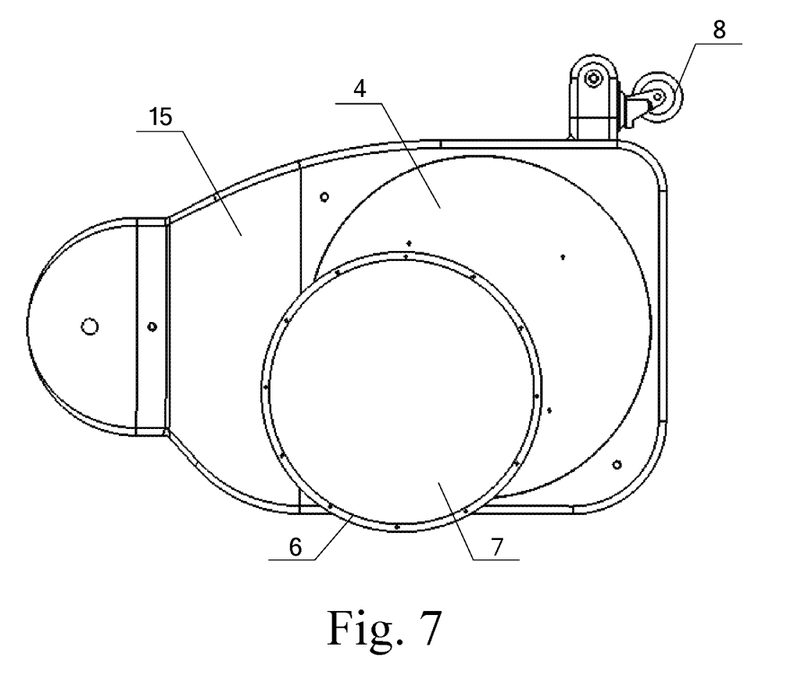
FIG. 7 is a structural schematic diagram in a crawling state of the present invention.

The present invention has the operating principle that:

The front wheels on both sides of the body shell 15 are respectively driven by two rotary stepping motors 11, and the rotational speed of the rotary stepping motors 11 is controlled to realize straight advancement and turning of the robot. An initial state is shown in FIG. 4. The lower part of the body shell 15 touches the ground and provides support together with the universal wheel 8 to keep an erect stationary state. The swinging stepping motor 13 rotates anticlockwise; the body shell 15 is driven to adjust the posture through the joint bracket 16 and the connecting plate 1; with the counterclockwise rotation of the rotary stepping motors 11, the center of the crawling robot is positioned directly over the front wheels to achieve the position shown in FIG. 5. At this time, the rotary stepping motors 11 are controlled to control the walking. When the state is shown in FIG. 5, the swinging stepping motor 13 swings counterclockwise while the rotary stepping motors 11 rotate the front wheels forward; the swinging stepping motor 13 is matched with the rotary stepping motors 11 to lift the driven back universal wheel 8 off the ground, so that the trolley is in a self-balancing state as shown in FIG. 6. When the state is shown in FIG. 6, the swinging stepping motor 13 swings counterclockwise so that the center of gravity of the crawling robot moves forwards; the body shell 15 is tilted forwards; and in order to maintain balance, the rotary stepping motors 11 rotate counterclockwise to move the body shell 15 forwards. The tilting angle can control the movement speed of the crawling robot to accelerate, decelerate, advance, reverse, or stand. In the soft ground, the swinging stepping motor 13 in the self-balancing state swings counterclockwise; the rotary stepping motors 11 rotate counterclockwise so that the body is attached to sand ground and the center of gravity is directly over the front wheels, as shown in FIG. 7. When the crawling robot stands upright, the swinging stepping motor 13 swings clockwise while the rotary stepping motors 11 rotate clockwise so that the center of gravity is always directly over the front wheels under the joint cooperation; and the body leaves the ground to form self-balancing again, as shown in FIG. 6. In the self-balancing state, the swinging stepping motor 13 swings clockwise while the rotary stepping motors 11 rotate clockwise so that the universal wheel 8 touches the ground and returns to the state shown in FIG. 5. At this moment, the crawling robot can walk or stand with three wheels on the ground. When the crawling robot stops working, the swinging stepping motor 13 swings counterclockwise from the state shown in FIG. 5 while the rotary stepping motors 11 rotate counterclockwise so that the lower end of the body shell 15 touches the ground and returns to the state shown in FIG. 4.

The invention claimed is:

1. A soft ground crawling robot, characterized by comprising front wheels, a universal wheel (8), lower end covers (4), a body shell (15), and a connecting plate (1), connecting shafts (3), wheel brackets (5), a supporting assembly, rotary stepping motors (11) and a swinging stepping motor (13) which are respectively installed in the body shell (15), wherein the front wheels are connected on both sides of the front end of the body shell (15); the universal wheel (8) is arranged on the rear end; the rotary stepping motors (11) are installed on both sides of the supporting assembly; an output shaft of the rotary stepping motor (11) on each side passes through the body shell (15) and then is connected with the front wheel on the same side; the swinging stepping motor (13) is installed on the supporting assembly; the output shaft is connected with the connecting plate (1); the connecting plate (1) is connected with the body shell (15) through the connecting shaft (3); the body shell (15) is driven to swing by the swinging stepping motor (11); the lower end covers (4) are rotatably connected on both sides of the body shell (15); the wheel bracket (5) is connected to the rotary stepping motor (11) on each side; and the wheel bracket (5) on each side is connected with the lower end cover (4) on the same side.

2. The soft ground crawling robot according to claim 1, characterized in that each front wheel comprises a front wheel body (6) and front wheel end covers (7); the front wheel body (6) is connected with the output shaft of the rotary stepping motor (11); and the front wheel end covers (7) are installed on both sides of the front wheel body (6).

3. The soft ground crawling robot according to claim 2, characterized in that the wheel surface of the front wheel body (6) is provided with a plurality of equidistant inner concave surfaces (17) with the same size along the circumferential direction; and the front wheel end covers (7) are arc-shaped wheel covers protruding outwards.

4. The soft ground crawling robot according to claim 1, characterized in that the connecting plate (1) is arc-shaped; both ends are respectively provided with the connecting shafts (3) connected with the body shell (15); a position between both ends of the connection plate (3) extends upwards to form an extension part A(18); the extension part (18) is provided with the connecting shaft (3) connected with the body shell (15); the end part of one end of the connecting plate (3) extends downwards to form an extension part B(19); and the extension part B(19) is connected with the output shaft of the swinging stepping motor (11).

5. The soft ground crawling robot according to claim 4, characterized in that the connecting plate (1) is provided with flanges (2) in the positions of connection of the connecting shafts (3); each of the connecting shafts (3) is passed by the flange (2); and both ends are connected with the body shell (15).

6. The soft ground crawling robot according to claim 1, characterized in that the swinging stepping motor (13) is installed on the supporting assembly through a joint bracket (16); one end of the joint bracket (16) is cylindrical, and the other end is an "L"-shaped plate; a body bracket (14) is arranged on the connecting plate (1); one end of the body bracket (14) is cylindrical, is sleeved on the cylindrical end of the joint bracket (16), and is connected with the output shaft of the swinging stepping motor (13).

7. The soft ground crawling robot according to claim 1, characterized in that the supporting assembly comprises an I-shaped supporting plate (9), a lower supporting plate (10) and an upper supporting plate (12); both ends of the upper supporting plate (12) and both ends of the lower supporting plate (10) are respectively connected with the wheel brackets (5) on both sides; the I-shaped supporting plate (9) is connected between the lower supporting plate (10) and the upper supporting plate (12); and both sides of the I-shaped supporting plate (9) are respectively provided with the rotary stepping motors (11) installed on the lower supporting plate (10) to drive the front wheels.

8. The soft ground crawling robot according to claim 1, characterized in that the body shell (15) is divided into left and right parts with the same shape and structure.

\* \* \* \* \*